United States Patent [19]
Min et al.

[11] Patent Number: 5,526,352
[45] Date of Patent: Jun. 11, 1996

[54] INTEGRATED LOW COMPLEXITY BROADBAND MULTI-CHANNEL SWITCH

[75] Inventors: Paul S. Min; Hossein Saidi, both of St. Louis, Mo.

[73] Assignee: Washington University, St. Louis, Mo.

[21] Appl. No.: 230,764

[22] Filed: Apr. 21, 1994

Related U.S. Application Data

[63] Continuation-in-part of Ser. No. 52,635, Apr. 22, 1993, Pat. No. 5,440,549.

[51] Int. Cl.$^6$ ..................................................... H04L 12/56
[52] U.S. Cl. .............................................. 370/60; 370/94.1
[58] Field of Search ............................... 370/53, 58.1, 60, 370/60.1, 61, 62, 65, 68.1, 79, 80, 85.6, 94.1, 94.2, 94.3

[56] References Cited

U.S. PATENT DOCUMENTS 5,172,371  12/1992  Eng et al. ................................. 370/60
5,305,311  4/1994  Lyles .

*Primary Examiner*—Melvin Marcelo
*Attorney, Agent, or Firm*—Rogers, Howell & Haferkamp

[57] ABSTRACT

A multi-channel, multicasting switch for an ATM network utilizes a particular nonblocking condition of the Flip Network, which is exploited to realize a multi-channel switching architecture that supports an arbitrary number of channel groups. Using a single Flip Network recursively, the resulting architecture becomes efficient in the sense that the crosspoint complexity is O(N log$_2$N) for N inputs. The number of times the Flip Network is used recursively is a function of the number of channel groups only. The architecture is internally nonblocking and bufferless. Distinguishing features are the abilities to provide multicasting, super-rate switching (i.e., rates that exceed the capacity of a single channel are accommodated), multi-rate switching (i.e., bit pipes of different rates are supported simultaneously), multiple performance requirements (i.e., services with different performance requirements are treated accordingly), and fairness (i.e., cells originating from different input channels and/or destined for different output channels are treated fairly). In multi-channel switching, cells belonging to a single session can traverse over multiple channels and the architecture maintains cells in order by assigning a specific Gray code to each data cell in each group.

24 Claims, 7 Drawing Sheets

| $b^1$ BINARY CHANNEL GRUOP ADDRESSES | $b^1$ GRAY CODEWORDS |
|---|---|
| 000 | 000 |
| 001 | 001 |
| 010 | 011 |
| 011 | 010 |
| 100 | 110 |
| 101 | 111 |
| 110 | 101 |
| 111 | 100 |
FIG. 4
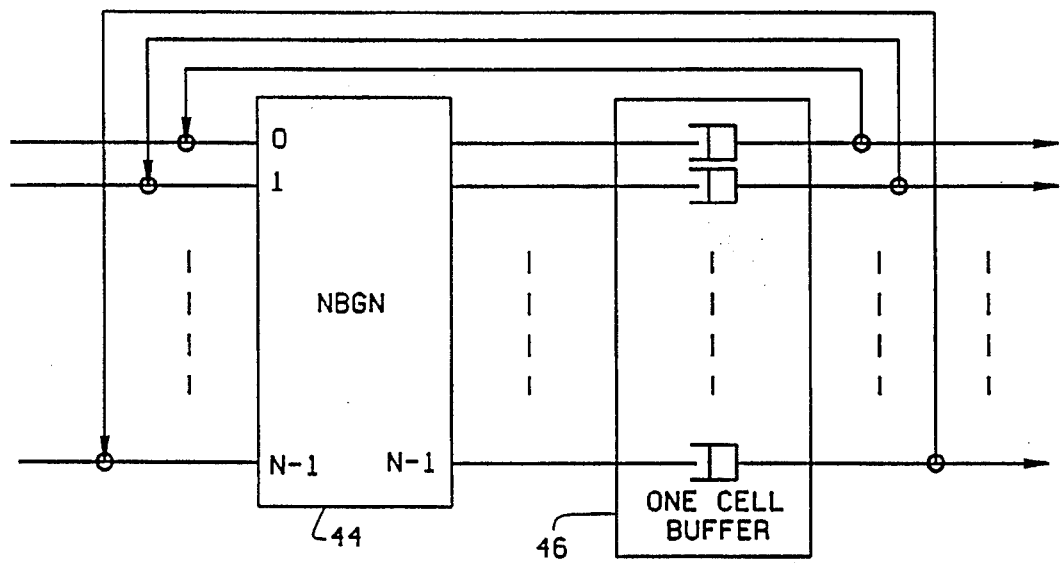
FIG. 5
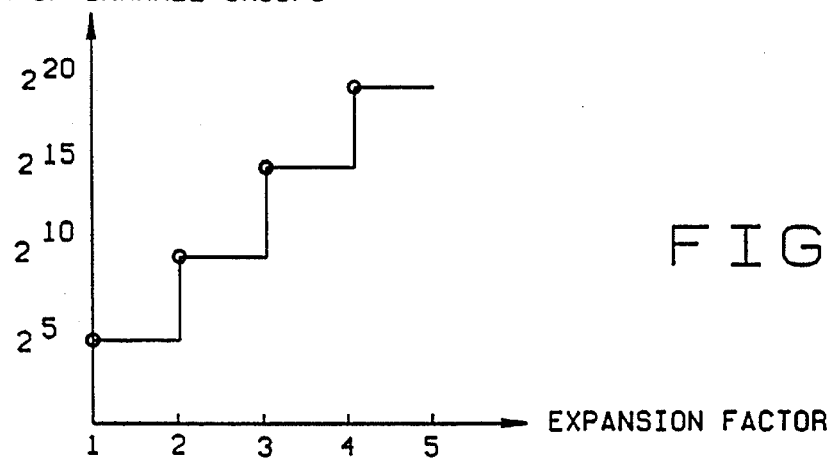
FIG. 7

INTEGRATED LOW COMPLEXITY BROADBAND MULTI-CHANNEL SWITCH

CROSS-REFERENCE TO RELATED APPLICATION

This application is a continuation-in-part of Ser. No. 08/052,635 filed Apr. 22, 1993, now U.S. Pat. No. 5,440,549.

BACKGROUND AND SUMMARY OF THE INVENTION

ATM switches need to provide a path between an input channel connected to the source point and an output channel connected to the destination point with a very high probability of successful transmission. The class of ATM switches satisfying such a requirement is called point-to-point switches (or single-channel switches as opposed to multi-channel switches). As shown in the prior art, point-to-point switches can be classified in terms of switching method, resulting in shared memory switches, shared median switches, and space division switches.

Even in an internally nonblocking point-to-point switch, throughput can be severely limited by other factors such as output contention and head of line blocking. As a result, a variety of buffering methods have been suggested, which leads to another way of classifying switches into internal buffer, input buffer, output buffer, and shared buffer.

Multicasting has been identified as an essential function in broadband communication networks, and examples of such are reported in the prior art.

An important issue for ATM is the development of a switching methodology that can support the very high bandwidth transmission associated with lightwave technology. The transmission rate over optical fibers has reached tens of gigabits per second and is likely to increase in the coming years. On the other hand, the processing speed of electronic switches remains substantially slower. Such a mismatch between the two quantities creates a natural bottleneck at the switching nodes in the network. A number of strategies have been proposed in the literature to improve the speed of packet switches and comprehensive surveys of these appear in the prior art.

Multi-channel switches have been proposed and studied in the literature as a means of alleviating the processing speed constraint of electronic switches in broadband networks. Multi-channel switches can provide higher performance (e.g., throughput, cell loss probability, delay) by exploiting the concept of channel grouping. Instead of being routed to a specific output channel, a packet is routed to any channel belonging to an appropriate channel group. (In the literature, channel group is also referred to as trunk group.) In ATM, a session is established by the assignment of a virtual circuit. The virtual circuit is defined in terms of a set of channels in transmission links connecting between the two end points of the session. However, many of the benefits associated with connection-oriented services do not require that the connection be specified at the channel level; it is sufficient to specify the path of the connection, not the specific channel within the path. This implies, among other things, that a packet can be routed to any one of a group of channels that connect the same two end points. We note that any interswitch connection is likely to be in the range of multiple gigabits per second, e.g., 2.4 gigabits per second via an OC48 connection of SONET. This corresponds to a number of ATM channels at 155 or 620 megabits per second, and a channel group may be defined as a collection of these channels transmitted over a single optical fiber.

The concept of channel grouping has been exploited for point-to-point channel switches. Path trunking has been considered as a means of reducing cell loss probability. Trunk grouping has been implemented to resolve output contention. The main purpose of channel grouping has been to provide higher throughput. Also, a link group has been used, but it differs from the channel grouping concept in that no statistical multiplexing is achieved in a link group.

One of the first reported architectures with multi-channel capability is found in Pattavina, A., "multi-channel Bandwidth Allocation in a Broadband Packet Switch," *IEEE Journal of Selected Areas in Communications*, Volume 6, No. 9, December, 1988, pp. 33–38. The switch proposed in Pattavina is internally nonblocking and is based on the Batcher-Banyan network. It requires $O((\log_2 N)^2)$ stages of interconnected 2×2 switching elements and it employs an input buffering scheme to resolve the output contentions, which requires a complex, three phase algorithm to allocate bandwidth. Lau, P. S. and Leon-Garcia, A., "Design and Analysis of a Multi-link Access Subsystems Based on the Batcher-Banyan Network Architecture," *IEEE Trans. Commun.*, vol. 40, No. 11, November 1992, pp. 1757–1766 improves upon Pattavina in the bandwidth allocation complexity, however the improvement is slight. The input buffering schemes used in Lau and Pattavina do not achieve the optimal delay-throughput performance.

On the other hand, others use deflection routing in an Omega network of $\log_2 N$ stages, but they result in non-zero blocking probability. To achieve a reasonable cell loss probability (e.g., $10^{-6}$), the switch utilization must be kept low. These networks are self-routing networks which require minimal complexity in call set-up control. The output of the switch is partitioned into channel groups as a function of the input probability; it implies that as the utilization of the switch changes, it is necessary to modify the partition to maintain the performance level, which is clearly undesired.

As the demand for new applications soars, greater variability in bandwidth and traffic characteristics (e.g., session duration, burstiness) is expected. The advantages of statistically sharing a higher channel capacity under such conditions are well known. For example, the link efficiency is increased by reducing the burstiness in the incoming traffic. Bit pipes of higher rates are formed which allow a number of applications to share bandwidth by dynamically allocating time slots. Assuming that the exogenous traffic intensity is fixed, a larger channel group size is less likely to incur blocking for a single ATM cell, for a burst of cells, or for a new connection request. Similarly, other performance measures such as delay, buffer overflow, and congestion would improve when multiple channels are grouped together as a single resource.

Another important benefit of multi-channel switching is the ability to provide super-rate switching. Applications requiring peak rates greater than a single ATM channel capacity would suffer high cell loss probability unless these applications can be assigned over multiple channels. Channel grouping would be a natural way to deal with such a problem. In reality, a channel group may correspond to a single fiber operating at an extremely high rate, and multi-channel switches can provide a means of transporting this bit pipe across broadband networks.

To solve these and other problems in the prior art, the inventors have succeeded in developing a switching paradigm that efficiently accomplishes multi-channel switching as a generalization of point-to-point switching paradigms that are currently prevalent. The resulting architecture must maintain the required features of point-to-point switching while providing the advantages of multi-channel switching as mentioned earlier. The required features of the switching architecture may be summarized as follows:

Multi-Channel Switching. The switch provides the ability to define output channels as a channel group; the output is partitioned into a number of channel groups with arbitrary cardinality. This ensures that the switch can support super-rate (i.e., rate that exceeds capacity of a single channel) switching of arbitrary bandwidth. Partition must be flexible and should not burden the switch with additional hardware and control complexities.

In-Order Cell Sequencing. One important benefit of a connection-oriented protocol is that the ordering among the cells belonging to a single session is maintained. In multi-channel switching, since cells belonging to a session can traverse over multiple channels, and thus they can experience a widely differing amount of delay and congestion, maintaining the ordering among them becomes a challenging issue. We aim to develop an architecture that guarantees in-order cell sequencing. Thus the need for a re-sequencing mechanism, which is often complex and expensive to implement, is eliminated. This issue has not been addressed by any previous work on multi-channel switching known to the inventors.

Simplicity. The multi-channel switching should be facilitated without necessarily increasing the complexity of the switch; this includes hardware complexity such as connection set up, flow control, and address translation. Observing the fact that the routing constraint in a multi-channel switch, where cells only need to arrive at any one of a number of output channels in the same channel group, is less stringent than point-to-point switching, it should be possible to reduce the switching complexity. The switch must be scalable to a large number of input and output channels (e.g., $2^{16}$).

High Performance. To ensure high performance, we constrain the internal fabric of the switch to be nonblocking and bufferless. A switch is non-blocking if every permutation of inputs which does not cause output conflicts can be realized by the switch. A bufferless architecture implies that at each switching element, all input cells must be transferred to the output without delay. These two constraints assure higher throughput and lower delay.

Multicasting. The ability to support multicast connections is considered an essential function for broadband networks. For example, broadcast video, teleconferencing and LAN bridging are services that require multicast capability. When cells are duplicated for multicasting, it is important to ensure that the ordering among the duplicated cells is maintained; such a requirement is not addressed in the previous multicasting architectures shown in the prior art. The issue of multicasting has not been discussed in the previous multi-channel switching works.

Multi-Rate Switching. It is desired that a single switch supports bit pipes of different bandwidths. For example, the current ATM standard defines two rates, viz., 155 and 620 megabits per second. Since the switch of the present invention allows channel group sizes to be defined arbitrarily, the two rates can be simultaneously supported in a single switch which corresponds to the capability of multi-rate switching.

Multiple Performance Requirements. As services with differing performance requirements are integrated into an ATM network, it is necessary to accommodate the characteristics of individual services as part of the managing capacity of the network. For example, consider two classes of service wherein one requires a tight bound on delay jitter with less stringent cell loss probability (e.g., voice and real-time video), and the other requires a small cell loss probability with more tolerance towards delay (e.g., file transfer). It is important to perform switching according to the differing performance requirements, especially when the network is congested by heavy traffic. In the switch architecture of the present invention, the aforementioned two classes of service may be accommodated, with a moderate amount of increase in the switching complexity.

Fairness. Sessions established at different input channels may not experience the same performance. Similarly, different output destinations may suffer from discriminating delay or throughput levels. Some switch architectures address this issue by specific provisions of fairness. In the switch of the present invention, fairness may be ensured at the cost of a relatively minor increase in switching complexity.

The inventors achieve the foregoing advantages while using a building block approach to constructing the switch. At its core is an NBGN or nonblocking binary group network which is itself comprised of a running adder and a Flip Network. An NBGN is a functional block that separates two groups of cells in a manner that cells belonging to the same group appear at the output as compact modulo N (N=number of inputs). The connection patterns in the NBGN are assigned such that the separation into any number of channel groups is achieved with minimal hardware functions and at the same time, the relative ordering among the cells is maintained. These NBGN's may be cascaded or data cells may be recycled through the NBGN as the inventors implement a bufferless switch. This recursive use of a single NBGN minimizes hardware to do multiple sorts of data cells into groups as required to separate them for transmission over multiple channel groups connected to the output of the switch to thereby achieve multi-channel switching.

For those applications requiring a large number of channel groups, such as might be experienced in a network with a large number of switches which are highly interconnected, an NBGN with a number of inputs equal to CN, where C is some positive integer and N is the number of input channels, reduces the speed constraint on the recursive use of the NBGN required by a large number of channel groups.

The inventors herein also take this multi-channel switch and expand it to accommodate multicasting using the same NBGN "building block" architecture. In essence, the multicasting/multi-channel switch of this invention includes a multicasting phase and a routing phase, and the inventors propose variations thereon to minimize memory requirements which might otherwise defeat this implementation.

The inventors also demonstrate how use of a recursive NBGN, or RNBGN, in the multicasting phase permits the data cells to be grouped according to a class of service to thereby provide priority of data cell transfer to be higher in one class than in another. This implementation facilitates the additional charges for value added service which are highly desirable in telecommunication networks.

One of the distinguishing features of the inventors' implementation in this multicasting/multi-channel architecture is the use of a Gray code numbering for labeling the cells for sorting. This Gray code ordering simplifies the hardware requirements to sort the data cells and is an elegant implementation which facilitates the class of service and fairness requirements. Still another distinguishing feature of the present invention is its ability to maintain the data cells in time order depending upon their relative position amongst the inputs within the same time period. By maintaining this relative position of the data cells as the data cells are processed, which may include recycling, the data cells remain in strict time sequence and thus the inventors eliminate the requirement of a resequencer as is commonly implemented in many prior art switches.

Eliminating the need for a resequencer along with the performance and control complexity gain in the present architecture facilitates the switch's use in switching data streams which more closely approach the data transmission capacities of fiber optic and other high speed channels to thereby minimize the bottleneck effect created by prior art switching architectures. As explained above, this consideration is very important in the future implementation of high speed data links as the limits of data speed transfer rates continue to be pushed.

While the principal advantages and features of the present invention have been explained above, a more thorough understanding of the invention may be attained by referring to the drawings and description of the preferred embodiment which follow.

BRIEF DESCRIPTION OF THE DRAWINGS

FIG. 4 is a table of a Gray code for channel group addresses;

FIG. 5 is a block diagram showing an example of recursive use of a single NGBN;

FIG. 7 is a chart of an expansion factor C versus number of channel groups;

DETAILED DESCRIPTION OF THE PREFERRED EMBODIMENT

Figure 1:
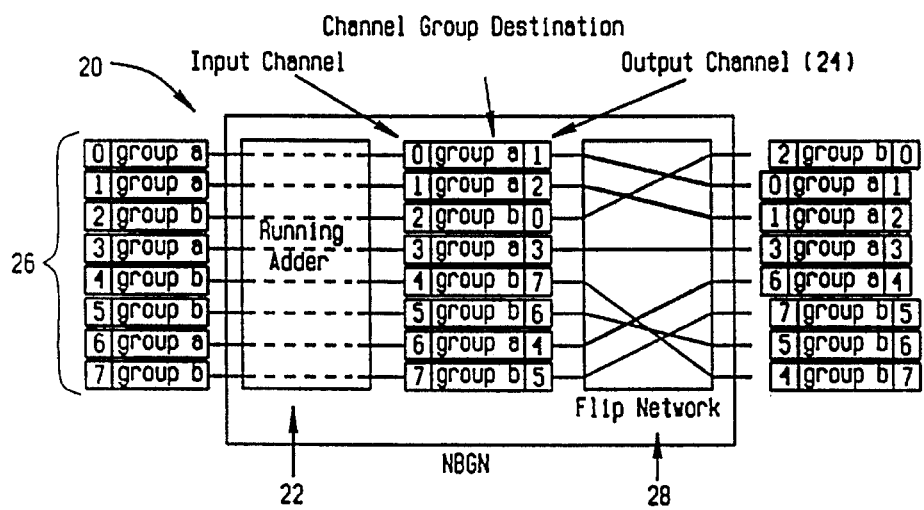
FIG. 1 is a block diagram of a nonblocking binary group network (NBGN)

As shown in FIG. 1, a nonblocking binary group network (NBGN) 20 includes a running adder 22 which assigns an output channel number 24 to a group of incoming data cells 26. As shown in the figure, the running adder assigns the group a cells to output channels starting at 1 in an ascending manner and the group b cells to output channels starting at 0 in a descending manner, modulo N. The starting output channel for group a can be any channel i, but we choose it to be 1 for illustration purpose. For group b, the starting output channel is i-1 modulo N. The use of address 0 is done such that the complexity of running sum generation is simplified. Such a grouping would not create any problem since the banyan routers (88, 101) are non-blocking with respect to these types of patterns. The Flip Network 28 reads this output channel number 24 and routes the data cells to the appropriately numbered output channel 24, as shown in FIG. 1. It can be shown that this arrangement is internally nonblocking in the multi-channel sense. It can also be shown that the use of this NBGN maintains the time ordering among the cells belonging to a session in that these cells may be kept in order, within their respective group, as determined by output channels assigned by the running adder 22 corresponding to their respective input channel, with the input channel at the top of the switch having a higher time ordering or priority than those input channels appearing below it.

Figure 2:
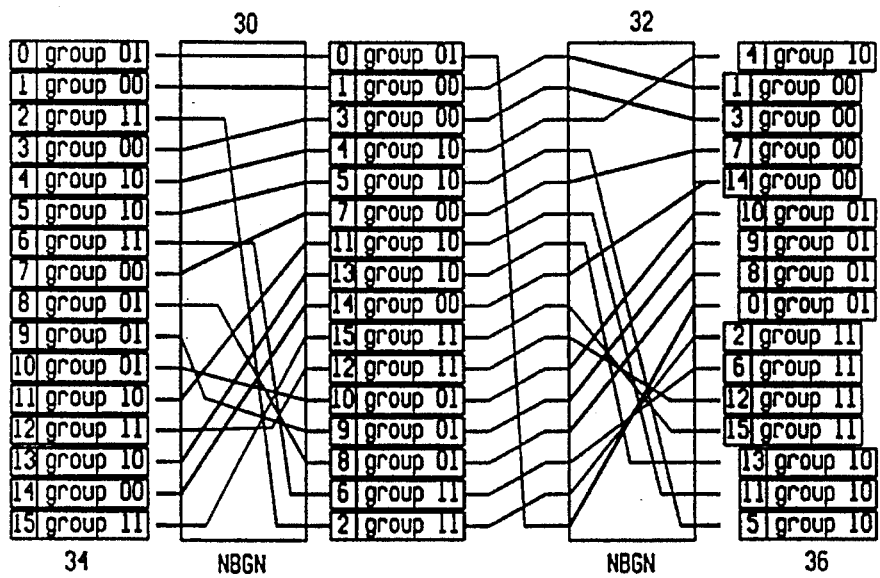
FIG. 2 is a block diagram showing a cascaded connection of two NBGN's.
Figure 3:
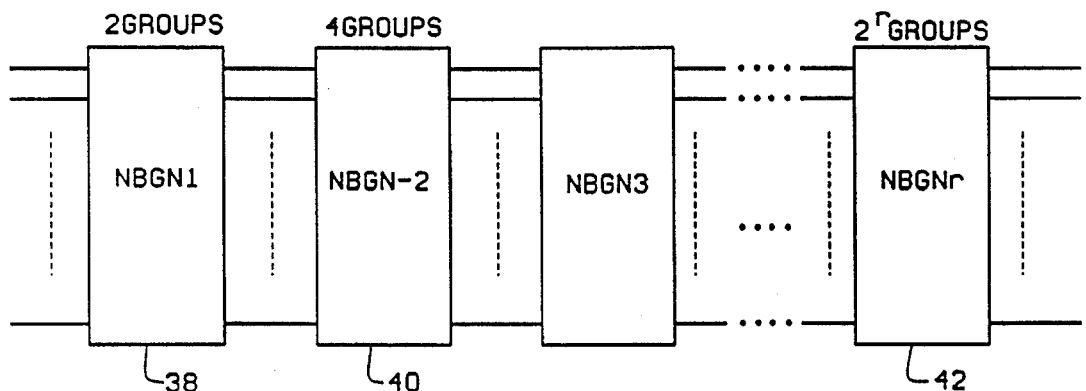
FIG. 3 is a block diagram of r cascaded NBGN's.

As shown in FIG. 2, a pair of cascaded NBGN's 30, 32 process a plurality of input data cells 34 into four groups of data cells 36 at the output of the second NBGN 32. After being processed by the first NBGN 30, the cells are grouped into two groups in accordance with the rightmost bit of their two-bit binary output channel group identifier as assigned by the running adder (not shown). The separation into four channel groups is completed at the output of the second NBGN 32. This time, however, cells are grouped based on the second bit of the channel group address. Thus, a cascaded use of two NBGN's accomplishes separation into four channel groups. Following this example, separation into any $2^r$ groups ($r \leq \log_2 N$) can be achieved by cascading r NBGN's as shown in FIG. 3. As shown therein, the first NBGN 38 separates the incoming data cells into two groups, modulo N. The second NGBN 40 separates these two groups of data cells into two more groups of data cells, modulo N, thereby resulting in four groups. This is exemplified also in FIG. 2. Thus, as the cells are processed by the r th NBGN 42, $2^r$ groups of data cells have been sorted.

It may be shown that by sorting on consecutive bits in a binary bit address that the ordering of the groups of cells at the output of the last NBGN in cascade produces groups in addresses which form a Gray code in specific form. It may also be shown that this specific Gray code may be bit mapped in a one-to-one relationship to binary sequencing. As Gray code sorting provides advantages as will be explained below, it is utilized and the multi-channel switch based on NBGN's must have stored in it the relationship that maps the channel group address and the corresponding Gray code word to be used in binary grouping performed by NBGN's. An example of such for the case of eight channel groups is shown in FIG. 4. Each time cells go through an NBGN, binary grouping is done based on a single bit in the Gray code words and for those cells with this bit equal to 1, the relative ordering among them is reversed. This may be confirmed by reviewing the ordering of cells at the output of NBGN 32 in FIG. 2. In order to maintain the in order cell sequencing, the inventors utilize Gray code words such that each Gray code word has an even number of ones (including the Gray code word for zero). In this way, cells belonging to the same session have the same relative ordering within their groups at the final output. Otherwise, the relative ordering at the final output for some channel groups will be reversed if their addresses have an odd number of ones. As shown in FIG. 2, the relative orderings for channel groups 01 and 10 are reversed at the output while the same relative orderings are observed for channel groups 00 and 11.

Recalling the grouping process in NBGN's, each channel group must be defined over consecutive output channels, modulo N. It follows that cascaded use of NBGN's realizes a multi-channel switch that is internally nonblocking in the multi-channel sense. The required number of NBGN's is determined by the number of output channel groups.

The above-described result of the cascaded NBGN's can also be realized by the recursive use of an NBGN with a single cell buffer. The combined function of the NBGN and the buffer is herein referred to as a Recursive Nonblocking Binary Group Network (RNBGN). An example of an RNBGN is shown in FIG. 5. As shown therein, a first NBGN 44 has inputs O—N-1 and outputs O—N-1, the outputs of the NBGN 44 being connected to a one cell buffer 46. The output of the one cell buffer 46 is then connected back to the inputs of NBGN 44 and the data cells may be recycled for a specific number of times in order to achieve the separation of the data cells into the required number of groups.

As a result, an internally nonblocking multi-channel switch is realized by the Flip Network of $\log_2 N$ stages; FIG. 5 is a multi-channel switch that is internally nonblocking in the multi-channel sense and that supports an arbitrary number ($\leq N$) of channel groups (including the point-to-point mode) by simply controlling the number of recursions performed over a single NBGN.

An N-input switch with $2^r$ channel groups requires r+1 recursive uses of the NBGN (the initial pass through the NBGN plus r recycles) to maintain the relative ordering. The minimum interarrival time between two consecutive ATM cells over a 155 megabits per second link is approximately $2.7\mu$ seconds. Assuming byte-wide operations of switching, a simple analysis indicates that a 16 input multi-channel switch operating at any number of channel groups can be realized by recursive use of a single NBGN based on CMOS technology with about 10 nano seconds gate propagation delay; this analysis is based on 53 bytes per cell resulting in about 530 nano seconds for each binary grouping process, which allows up to five recursions during the minimum cell interarrival time.

On the other hand, when the number of channel groups becomes large, it is not possible to complete the required number of recursions within the minimum time. For example, if the multi-channel switch is used without any channel grouping, the number of channel groups equals the number of input channels; this requires the maximum number of recursions and a modification of the NBGN will be necessary to eliminate this problem.

As the number of channel groups increases, the speed constraint on the recursive use of the NBGN becomes tighter with the tightest speed constraint occurring when there is no channel grouping. Thus the maximum number of recursions for N inputs is $\log_2 N+1$ which must be completed within the minimum interarrival time of $2.7\mu$ seconds. Thus there is an upper bound on N for a given gate delay time.

Figure 6:
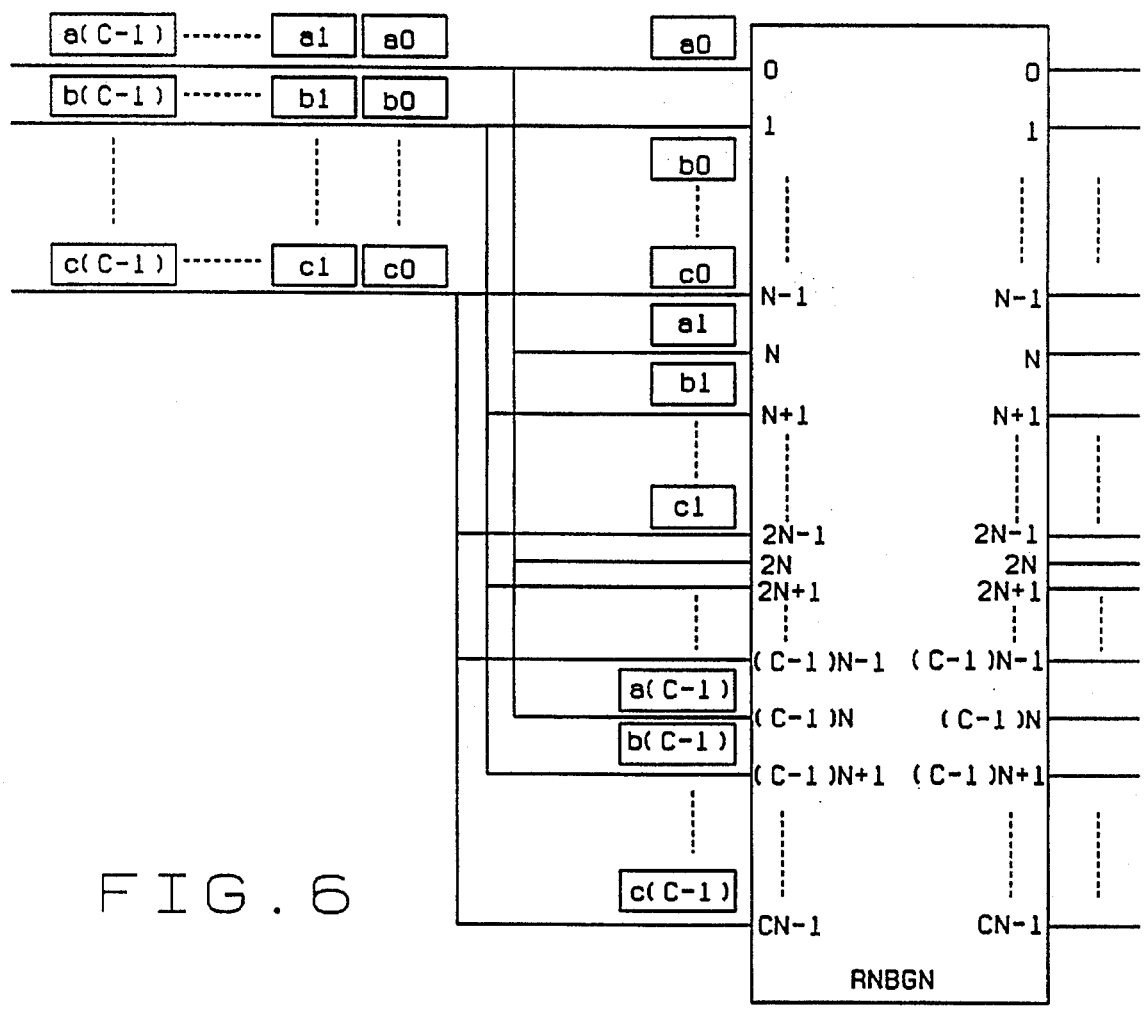
FIG. 6 is a block diagram showing an NBGN with CN inputs.

To realize a multi-channel switch with large N (say $2^{16}$) (and hence potentially a large number of channel groups), an RNBGN with the number of inputs equal to CN may be used where C is some positive integer which we call the expansion factor. As cells arrive at each input they are buffered and collected for C consecutive cell slots (i.e., $C\times 2.7\mu$ seconds). Then each input line is distributed over C input channels in the CN-input RNBGN, as shown in FIG. 6.

We now have $C\times 2.7\mu$ second to complete the required number of recursions until the next batch of cells arrive. For each value of C, there is a maximum number of recursions that can be performed. Based on the current CMOS technology (with about 530 nanoseconds per recursion), FIG. 7 shows the relationship between C and the number of channel groups that can be supported. The separation of a very large number of channel groups can be realized with a small value of C.

When the switch is used in a multi-channel mode, the number of recursions could be much less than $\log_2 N+1$. In a network that spans a large geographical area and serves a large number of traffic sources, a significant portion of the switch outputs would be dedicated as interswitch connection links. Each of these links is likely to be a single fiber operating at a very high speed. For them, channel grouping is a natural concept that can result in significant performance benefits. Suppose that the output of a switch is partitioned into four to eight channel groups that connect to other switches in the network. (For example, this is a reasonable value for the telephone switches currently in use.) Then, regardless of what N may be, the proposed switch needs a maximum of only four recursive uses of an N-input NBGN. This can be accomplished within $2.7\mu$ seconds by most any technology nowadays.

There are a number of ways to reduce the gate delay time via sophisticated, custom-made technology. For example, if the switch used galium arsenide technology with a gate delay time of less than one nanosecond, an RNBGN with expansion factor C=1 can support more than $N=2^{50}$ (which obviously will be limited by various packaging constraints). Another way to cope with the gate delay time is to simply widen the data path within the switch. For example, instead of byte-wide switching, word-wide (i.e., 16 bits) switching can significantly increase the maximum value of N supported by an RNBGN with C=1.

The recursive use of an NBGN may also be utilized in a multi-channel switch capable of multicasting. In order to guarantee high throughput, a shared buffering method is employed to resolve output contention; the input buffering methods used in the prior art suffer from the head-of-line blocking and thus exhibit less than optimal delay-throughput performance. The shared buffering method is optimal in the delay-throughput performance and requires a smaller number of buffers than output buffering schemes found in the prior art.

Figure 8:
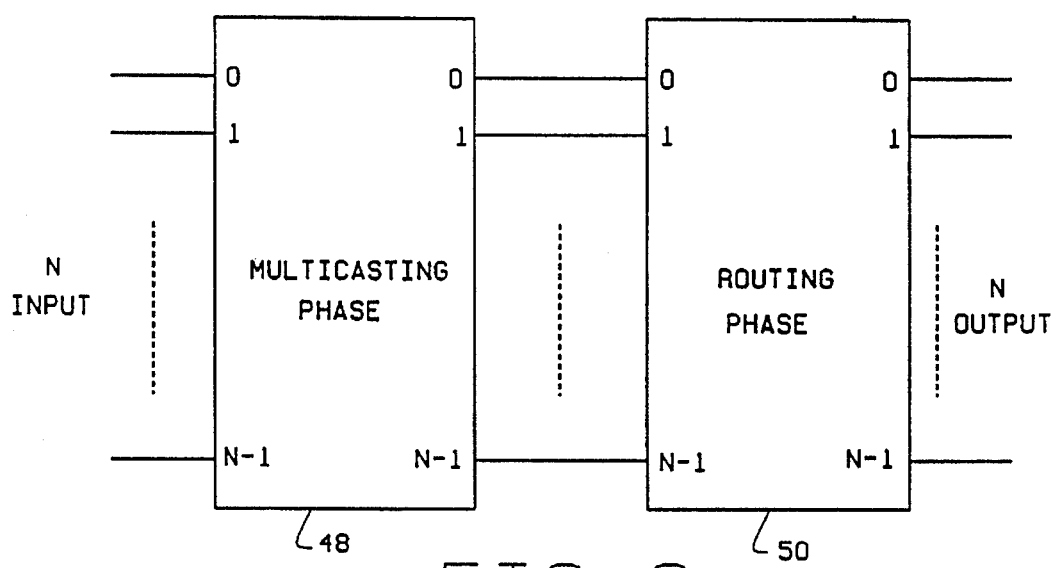
FIG. 8 is a block diagram of an overall switch architecture with multicasting.

The overall architecture of the switch is best viewed as a two phase structure involving the Multicasting Phase 48 and Routing Phase 50, as shown in FIG. 8.

When a cell arrives at the input, VPI/VCI is extracted from its header which determines the required connection in the switch. The first stage of connection is the Multicasting Phase which generates an appropriate number of copies of the cell. The main function of the Routing Phase is to deliver these cells to the correct destinations.

A critical requirement for ATM networks is to provide consistent performance to individual applications when the patterns in the exogenous traffic entering the networks vary stochastically. This requirement includes supporting not only point-to-point connections but also multicast connections associated with, for example, broadcast video and teleconferencing. Several designs of ATM switch architectures that provide multicasting are described in the prior art.

Figure 9:
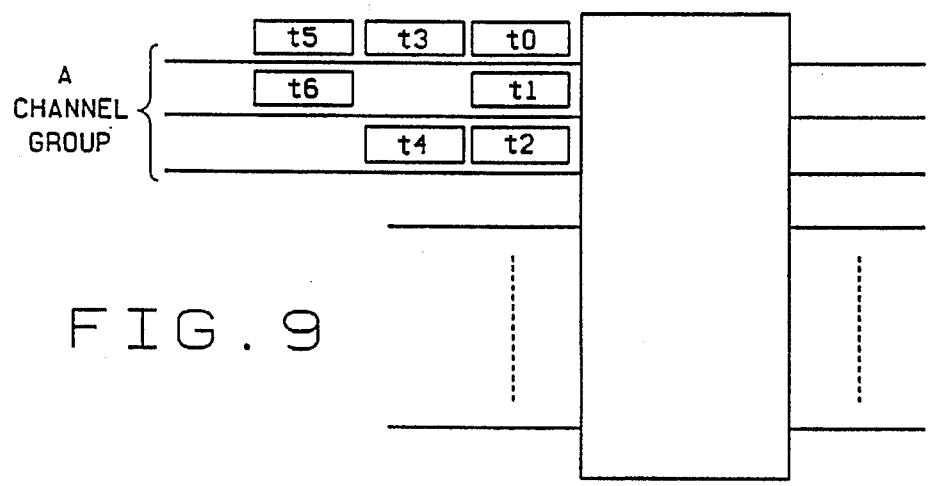
FIG. 9 is a block diagram illustrating time ordering of cells.

In multi-channel switching, cells that belong to a single session can be routed to their destinations via multiple channels. This implies that to guarantee the in-order cell sequencing throughout the network, it is necessary to maintain the time ordering among the cells not only in the same link but also in all links that belong to the same channel group. An efficient way to achieve this is to equate the time ordering among cells with their relative ordering and to maintain this relative ordering at each switching entity. Then, within a channel group, a lower indexed link (one that appears above) has the higher time ordering than do higher indexed links at each time slot. An illustration of this is shown in FIG. 9 using a sequence of cells generated by a single session at $t_0 < t_1 < t_2 < \ldots$.

Figure 10:
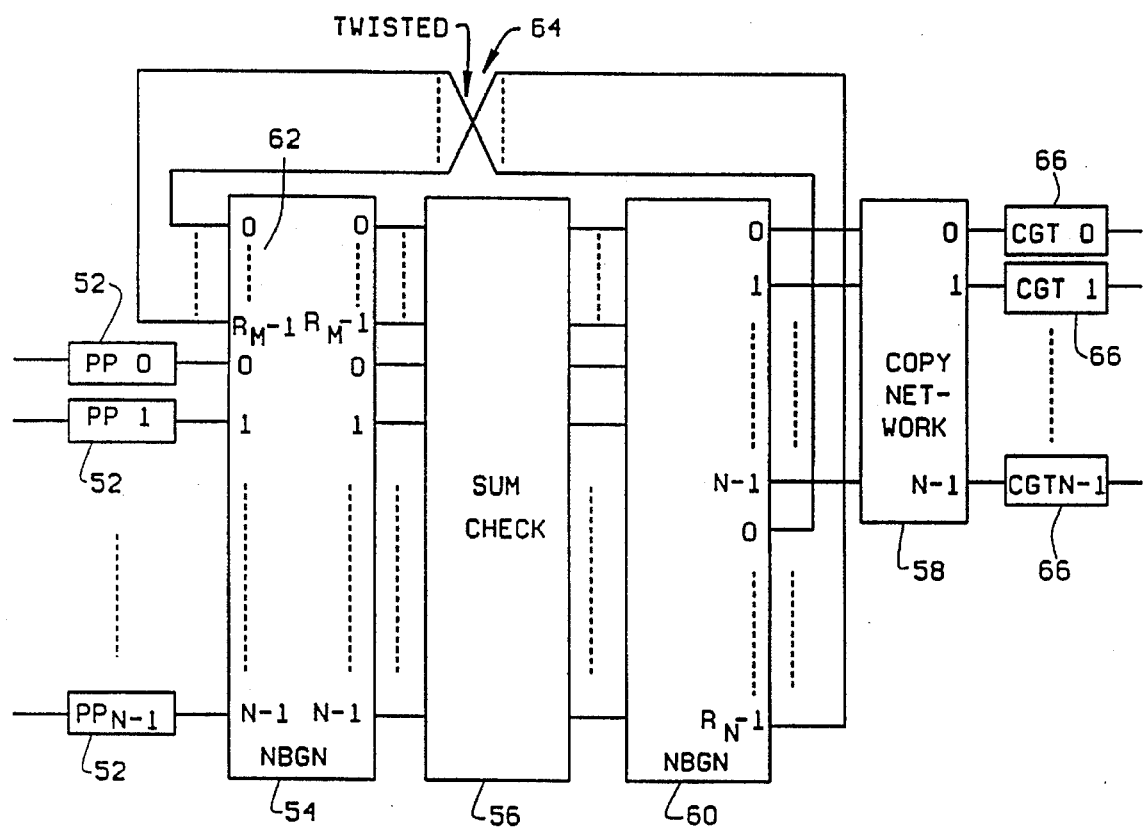
FIG. 10 is a block diagram showing the details of the Multicasting Phase.

The details of the Multicasting Phase 48 (FIG. 8) are shown in FIG. 10. The requirement of in-order cell sequencing places an additional constraint on the Multicasting Phase. We note that the multicasting methods proposed in the prior art do not address this issue. The prior art literature in multi-channel switching does not include the multicasting function.

Figure 11:
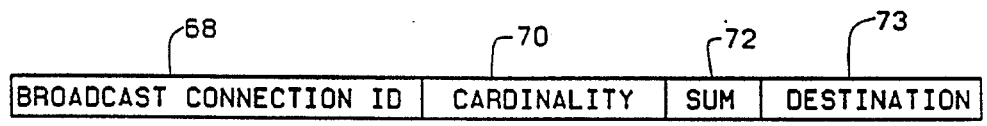
FIG. 11 is a diagram illustrating four additional fields for augmenting data cells for multicasting.

Operations in FIG. 10 are as follows: A cell arriving at an input channel i is processed by the Port Processor (PP) 52 i; the PP i extracts VPI/VCI from the cell and determines from a table stored in it the required number of copies. The cell is augmented by the four additional fields shown in FIG. 11. Then the PP i records in the Broadcast Connection ID field 68 a unique identifier given to this VPI/VCI during the connection set up time; the recorded value in the Broadcast Connection ID field 68 is maintained throughout the switch and is used to determine the required information for all functions of switching. In the Cardinality field 70, the number of copies to be made for this Broadcast Connection ID 68 is recorded. The PP also records 0 in the Sum 72 field for all active cells. Empty cells are assigned 1 in the Sum field 72.

The augmented cell now enters the $(N+R_M)$-input NBGN 54 ($R_M$ is the number of input channels reserved for recirculation which is described shortly). Based on the value stored in the Sum field 72, the NBGN 54 performs the binary grouping, modulo N.

After passing through the NBGN 54, the active cells enter the sum check 56 (SC) over a compact interval (i.e., all active inputs appear consecutively, modulo N). The active cells are processed by the SC 56 which determines whether or not the fan-out request of the cells can be accommodated by the Copy Network 58 (CN). The SC 56 calculates the running sum of the fan-outs starting from the input channel 1; each cell is marked 0 in its Sum field 72 if the running sum of fan-outs including its own does not exceed N, and otherwise, the cell is marked 1. From the running sum, the sum check (SC) 56 determines for each cell marked 0 the destination output of the banyan router 101 to which the cell is to be routed. This is recorded in the destination field 73.

Since the fan-out requests for the cells belonging to the same session are identical, the SC 56 may skip over a cell violating the fan-out limit in order to allow cells below it to be passed through. It can be seen that this maintains the time ordering among the cells; if the fan-out request of a cell is rejected, all fan-out requests of subsequent cells belonging to that session would be rejected during the same time slot.

Cells are then routed to the second NBGN 60 where according to the Sum field 72, they are either passed to the CN 58 (if the Sum value is 0) or routed to the recirculation path (if the Sum field 72 value is 1) for being fed back to one of the $R_M$ inputs 62 of the NBGN 54 reserved for recirculation. The recirculated cells are tried again at the next time slot at which time their priorities have been increased due to their positions (i.e., they appear at the top) at the input of the NBGN 54; they are given higher priorities over the cells entering the switch for the first time since the running sum at the SC 56 always starts from the top. Maintaining the relative ordering among the recirculated cells is accomplished by twisting recirculation paths 64 before connecting back to the input. (This is due to the fact that the relative ordering among the recirculated cells are reversed by the second NBGN 60.)

Figure 12:
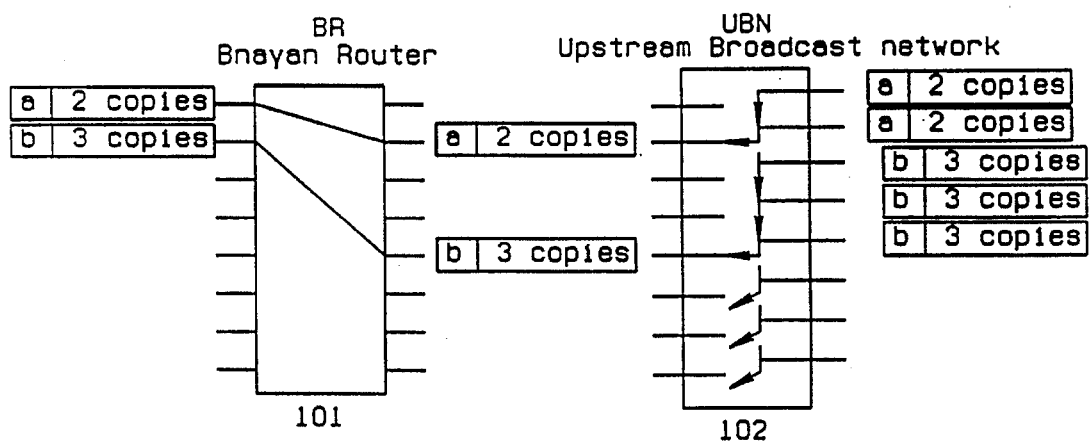
FIG. 12 is a block diagram of a nonblocking copy network.

The cells passed to the CN in FIG. 12 are routed to the output of the BR 101 according to the destination 73 computed by SC 56. The upstream broadcast network 102 then broadcasts the cells to the proper output destinations of the CN 58 with the number of duplicated cells matching the connection request. The amount of memory required to implement the Channel Group Translator (CGT) 66 may be excessively large as pointed out in the prior art, and below, we suggest ways to alleviate this.

Consider the copy network shown in FIG. 12. The output for a cell changes continuously due to the fan-out requirements of the other cells with higher relative ordering at the input. So each CGT 66, where the replicated cells are given the channel group addresses to be used in the Routing Phase, needs to store the information of every Broadcast Connection ID 68. Assume N is the number of input channels, B the number of broadcast connections allowed in the switch for each input, and W the number of bits needed for identifying all end-points of a broadcast connection. Then the memory requirement per CGT 66 becomes NBW bits since the maximum fan-out for a broadcast connection is N.

In the prior art, it is known that even for a moderately sized switch with N=256, the memory requirement becomes 256M bits per CGT 66 if $B=2^{16}$ and W=16. One way known in the prior art to reduce this requirement is by sharing a single table among multiple CGT's, categorizing broadcast connection requests in terms of the fan-out cardinality, and imposing some restrictions on the routing patterns in the copy network. The memory requirement then becomes 272K bits per CGT. While this reduces the memory requirement substantially, for fixed B, the per-CGT memory requirement is still dependent on N; as N grows, it may be large.

Figure 13:
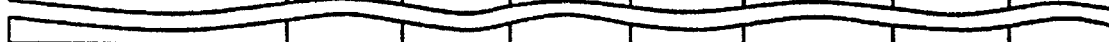
FIG. 13 is a block diagram showing a memory table for each CGT.

In order to realize a copy network for very large switches, the size of memory per CGT must not grow as a function of N. The following chain of observations alleviates the dependence on N: Since the routing patterns in the copy network change constantly, the same global information describing all broadcast connections must be stored at each CGT. An example of this is shown in FIG. 13 where each row corresponds to the description of a broadcast connection with up to N entries. The number of actual entries in a row equals the fan-out of the broadcast connection and the rest of the elements in the row are empty.

Figure 14:
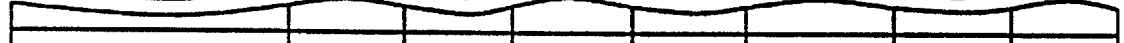
FIG. 14 is a block diagram showing a modified CGT memory table.

The table in FIG. 13 is modified such that each row is completed by repeating the entries as many times as necessary. This is shown in FIG. 14. It is easy to see that the $i^{th}$ column of the table in FIG. 14 contains for each broadcast connection the proper output address that CGT i needs to provide.

Only one column of the table needs to be stored per CGT and in this case the memory requirement becomes BW.

While this method does not allow for sharing a single table among multiple CGT's as suggested by the prior art, categorizing connections in terms of the cardinality is not necessary and there is no routing restriction in the CN, which should simplify the call control process.

Assuming S to be the number of CGT's sharing a single table, the memory requirement becomes smaller for N relatively larger than S; S is bound by the memory access and processing times. For realistically sized public switches, N is much larger than the S values associated with the current technology.

Figure 15:
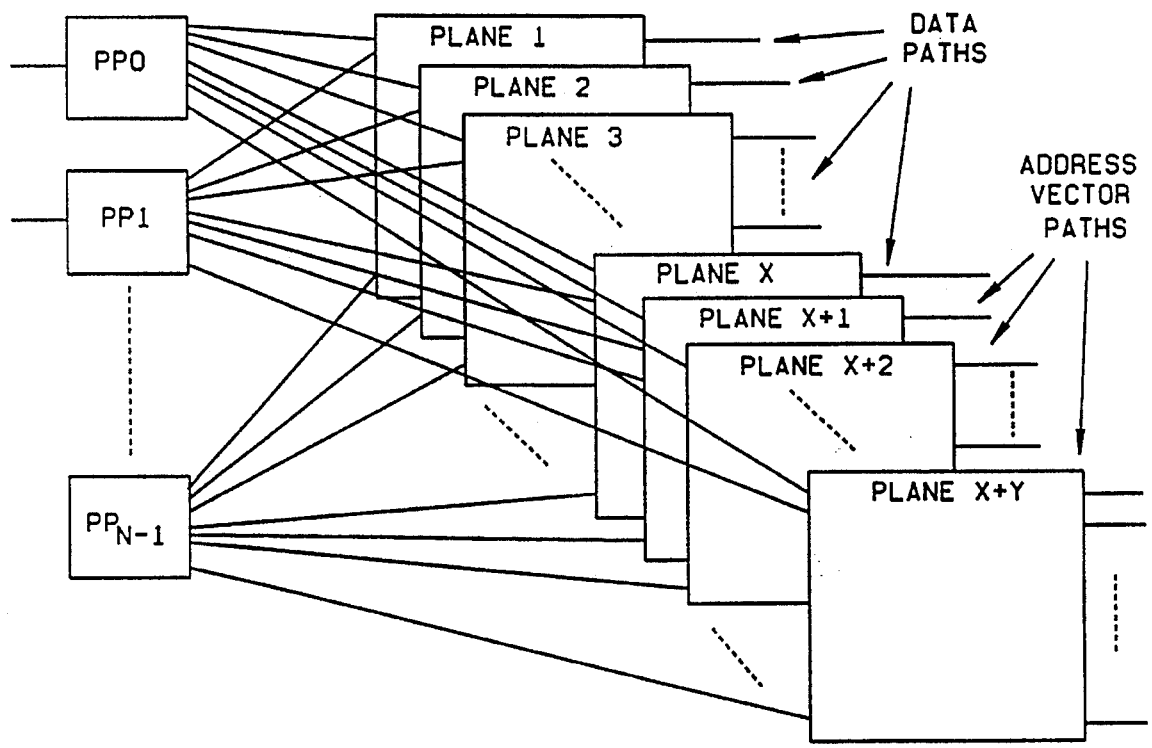
FIG. 15 is a block diagram of a copy network with reserved switching planes.

For values of N close to S, where the memory reduction is not significant, it is possible to eliminate the broadcast connection table entirely by the following scheme: Consider the copy network shown in FIG. 15. In FIG. 15, we have shown the path of data in x parallel switching planes and additional y planes reserved for address vectors. An address vector is an N-bit binary number and is defined for each broadcast connection. The $i^{th}$ position of an address vector is set to 1 if the corresponding broadcast connection includes the $i^{th}$ channel group of the switch. Otherwise, it is set to 0.

When a cell arrives at the Port Processor (PP) i, the address vector associated with the cell is created and enters the switching planes reserved for it at the input channel i of the switching planes. As the cell traverses through the copy network, the connection pattern (including the replications) in the switching planes reserved for the address vector is made identical to those of the data paths. This ensures that the address vector (or multiples of it if duplicated) appears at the output channel of the reserved switching planes at the same channel number where the cell appears. Hence the channel group address for the cell to be used in the Routing Phase is determined from the address vector which is now available at the same output channel of the CN.

Since ATM cells are 53 bytes long, so byte-wide switching (i.e., x=8) requires passing 53 bits of data per switching plane. During this time, the address vector must pass through its switching plane(s) and it implies that y=[N/53] additional planes are needed. For reasonably small values of N (i.e., N≦53), a single additional switching plane eliminates the need for a CGT. We note that if cells traverse in byte-wide fashion, one additional switching plane corresponds to (1/9) of the total bandwidth.

Fairness is achieved in the Multicasting Phase by virtue of the recirculation paths. Cells that are delayed in one time slot are given priority in the next slot; when the switch is heavily used, sessions with delayed cells in a time slot are likely to be accommodated in the next time slot since those cells are recirculated and are given higher priority. On the other hand, sessions whose cells were accommodated previously are more likely to be delayed due to the cells appearing at the recirculation inputs with higher priority. Hence, no session is subject to unfair, sustaining patterns of delay. This behavior is observed for any session, regardless of the input channel where the session is established. Destinations of the cells arriving at input channels are equally likely among all channel groups and so output destinations are treated fairly.

Another objective stated above is to support the multiple performance requirements. Consider again the example of the two service classes: For cells belonging to one service class (say class 0) it is important to deliver them to the destinations with as little delay as possible. If timely delivery is not possible, these cells may be dropped occasionally without affecting the quality of the service. An example of such a service would be voice. For cells belonging to the other service class (say class 1), it is critical to deliver them always at any amount of delay. An example for this class is file transfer.

Figure 16:
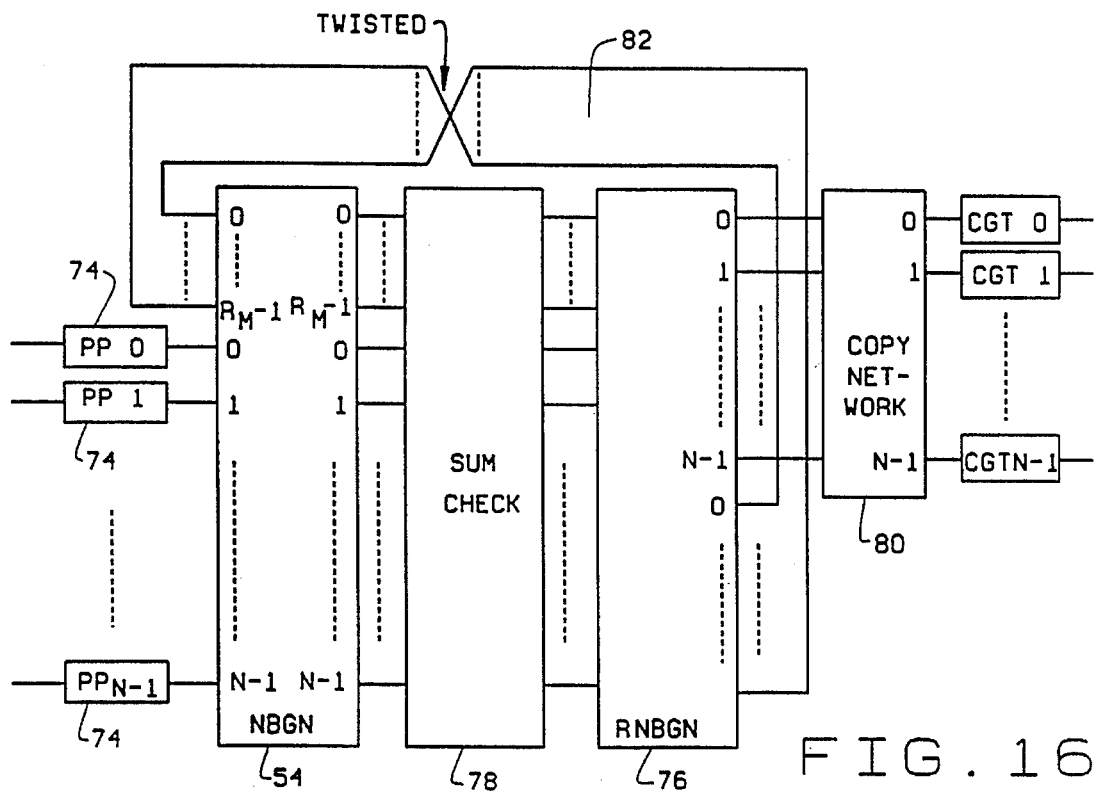
FIG. 16 is a block diagram showing the multicasting phase with multiple performance requirements.

The Multicasting Phase is modified in FIG. 16 to accommodate the distinguishing characteristics of the two service classes. For each cell, the PP 74 identifies from VPI/VCI the service class type to which the cell belongs. The NBGN 60 in FIG. 10 is replaced with the Recursive NBGN (RNBGN) 76 wherein cells are separated into the following three groups: active cells belonging to class 0 (group 0), active cells belonging to class 1 (group 1), and empty cells (group 2). Hence two recursive uses of an NBGN are required. Assign proper binary addresses to the three groups so that group 0 appears starting at output channel 1 of the RNBGN 76, group 1 appears next and then group 2 with the relative ordering among the active cells preserved, modulo N. In this way, we can still guarantee the in-order cell sequencing (since cells from the same session belong to the same service class) and provide fairness among the input channels mentioned earlier. The result of the operation thus far is that class 0 cells are given higher preference by the SC 78 and hence they are less likely to be delayed in passing to the CN 80.

On the other hand, cells that need to be delayed due to the fan-out limit must be recirculated. It is possible to incur an overflow condition if the number of recirculation paths is smaller than the number of cells to be recirculated. Some cells would be lost and we want to ensure that class 0 cells are lost before any of the class 1 cells.

The overall function of the SC 78 is unchanged: The SC 78 accumulates the running sum of the fan-outs as before. Then it determines for each cell whether or not it can be passed to the CN 80 and if it can be passed, the SC 78 determines the destination of BR 101. The RNBGN 76 distinguishes between classes 0 and 1 by separating cells into the four groups, cells to be passed to the CN 80, class 1 cells to be recirculated, class 0 cells to be recirculated, and empty cells while maintaining the relative ordering among the active cells within a group. Among the cells to be recirculated, the RNBGN 76 gives higher priority to class 1 such that the $R_M$ recirculation paths 82 accommodate as much of class 1 cells as possible. The result of this is that class 0 cells are more likely to be dropped than class 1 cells.

The throughput of a switch is constrained by the contention among inputs vying for the limited number of output channels in a channel group, even if the switch is internally nonblocking. Of the buffering schemes discussed in the prior art, the shared buffering scheme achieves the optimal delay-throughput performance with a small number of buffers. Unlike the input buffering schemes, the shared buffering scheme is not subject to head-of-line blocking which reduces the throughput.

Figure 17:
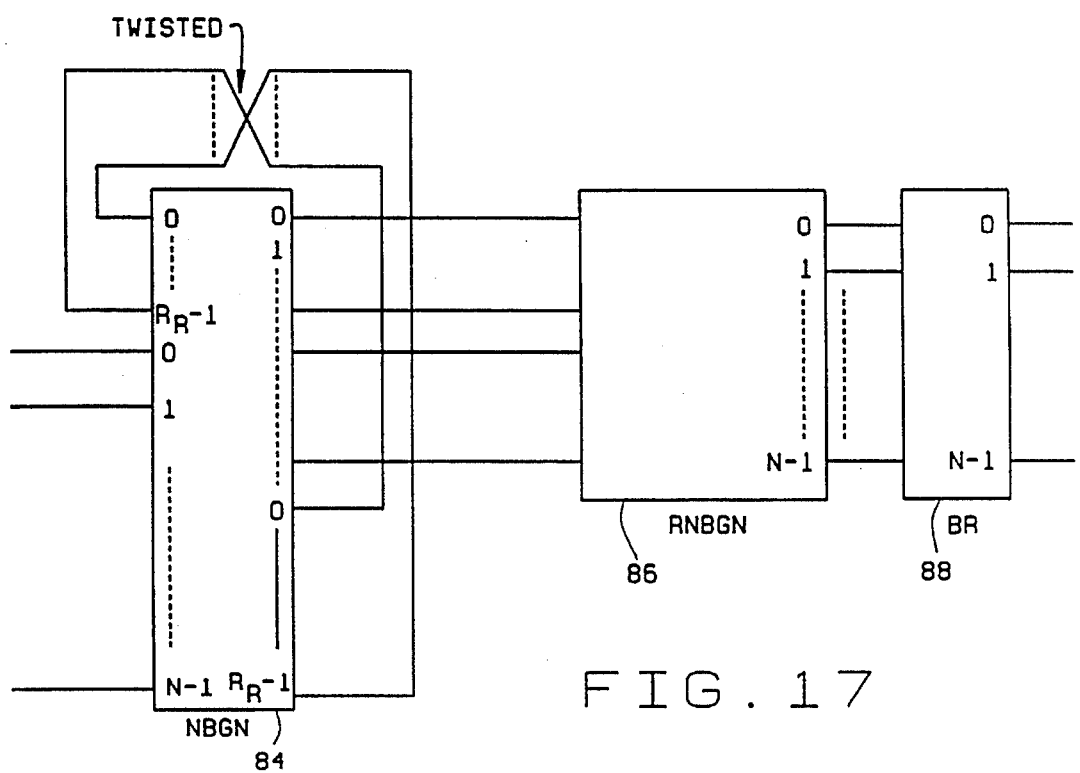
FIG. 17 is a block diagram showing the details of the routing phase.

Consider the switching architecture in FIG. 17 where $R_R$ of the $(N+R_R)$ inputs available in the NBGN are reserved for recirculation. Cells targeted for various channel groups enter at the input and any cell which is subject to contention and is not finding an output channel is marked for recirculation. To achieve this, NBGN 84 employs certain header checking functions which are not shown here explicitly. (This modification would be apparent to one of ordinary skill in the art.) The cells that are not recirculated then enter the RNBGN 86 and iterate through the RNBGN 86 for proper grouping. After completing the required number of excursions, they appear at the output of the RNBGN 86 according to a Gray coded sequence of channel group addresses.

If desired, the multi-casting phase of FIG. 10 can be implemented in nearly identical architecture as shown in FIG. 17, thereby enabling one VSLI implementation (chip) for either functionality.

The cells passed to the Banyan Router (BR) 88 can be routed to the proper destinations without further possibility of contention since the BR is nonblocking with respect to compact inputs that are destined for monotone ascending output addresses. The excess cells are recirculated for attempts at the next time slot at which time they are given priority due to the higher relative ordering of the recirculated paths. Such a mechanism ensures that the in-order cell sequencing is maintained.

The value $R_R$ reserved for the recirculation is an important factor that influences the overall performance of the switch. In the prior art, it is noted that to maintain the cell loss probability of $10^{-6}$ in point-to-point switching, $R_R$ should be about 2.5×N for 80% utilization. This number can be reduced if multiple, parallel BR's are provided. For example, even with a 100% utilization of input, $R_R$ becomes less than 0.4N if two BR's are implemented in parallel.

When there is significant difference between transmission speed over optical fibers and the processing speed of electronic switches, multi-channel switching can play a significant role in alleviating the bottleneck at the switching node. The present invention demonstrates an efficient architecture for multi-channel switching that enables multicasting, multi-rate switching, and super-rate switching while at the same time guaranteeing in-order cell sequencing. The architecture is simple in both hardware and control complexity and achieves high performance in throughput and delay.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A non-blocking switch for an ATM network having:
   a plurality of inputs for connection to a plurality of input channels over which a plurality of data cells arrive in a sequence;
   a plurality of outputs over which said data cells are routed to i+1 output channels, where i is a nonnegative integer, said i+1 output channels being grouped into a plurality of channel groups; and
   a processor for processing said data cells from said inputs to at least one of said channel groups, said processor assigning a first plurality of said data cells to outputs in a first channel group starting with output channel i, assigning a second plurality of said data cells to outputs in a second channel group starting with output channel i−1, and maintaining the sequence of said data cells as they are processed.

2. The switch of claim 1 wherein said processor sorts said data cells into said channel groups.

3. The switch of claim 2 wherein said processor comprises at least one NBGN.

4. The switch of claim 3 wherein said processor comprises a plurality of NBGN's.

5. The switch of claim 3 wherein said processor recycles said data cells through said NBGN to thereby sort said data cells into a greater number of channel groups.

6. The switch of claim 5 wherein said NBGN sorts said data cells into two channel groups so that said data cells are sorted into $2^r$ channel groups by being recycled through said NBGN, where r equals the number of cycles required to separate said channel groups.

7. The switch of claim 6 wherein said NBGN has an output and further comprising a buffer at said NBGN output to separate in time each cycle of data cells through said NBGN.

8. The switch of claim 7 wherein the number of switch inputs equals a factor C times the number of input channels, where C equals a positive integer, and further comprising a buffer at the input of said NBGN.

9. The switch of claim 2 wherein said processor assigns said outputs in a Gray code order.

10. The switch of claim 1 wherein said processor maintains the sequence of the data cells according to their input channel and according to their time period.

11. A non-blocking switch for an ATM network having:
    a plurality of inputs for connection to a plurality of input channels over which a plurality of data cells arrive in a sequence;
    a plurality of outputs over which said data cells are routed to a plurality of output channels, said plurality of output channels being grouped into a plurality of channel groups; and
    a processor for processing said data cells from said inputs to at least one of said channel groups, said processor maintaining the sequence of said data cells as they are processed, said processor including a multicaster for multicasting at least a selected one of said input channels to a selected plurality of said output channel groups, said multicaster including an upstream broadcast network.

12. The switch of claim 11 wherein said data cells are processed such that their sequence is the same as they leave said switch through said outputs.

13. The switch of claim 11 wherein said multicaster recycles data cells.

14. The switch of claim 13 wherein said multicaster includes an NBGN, said NBGN having two groups of inputs, one of said input groups being reserved for recycled data cells.

15. The switch of claim 14 wherein said processor maintains the sequence of said data cells according to their input channel and according to their time period.

16. The switch of claim 15 wherein said NBGN processes the data cells appearing at said recycled data cell input group before the other of said group of inputs to said NBGN.

17. The switch of claim 16 wherein said multicaster sorts the data cells into a plurality of service classes, said service classes determining the priority for processing of said data cells through said switch.

18. The switch of claim 17 wherein said multicaster includes an RNBGN for sorting said data cells into the plurality of service classes.

19. The switch of claim 11 wherein said multicaster includes a plurality of NBGNs.

20. The switch of claim 19 wherein said multicaster includes a sum check.

21. A non-blocking switch for an ATM network having:
    a plurality of inputs for connection to a plurality of input channels over which a plurality of data cells arrive in a sequence;
    a plurality of outputs over which said data cells are routed to a plurality of output channels, said plurality of output channels being grouped into a plurality of channel groups; and
    a processor for processing said data cells from said inputs to at least one of said channel groups, said processor including an NBGN and a RNBGN, said NBGN sorting said data cells into a first group and a second group, said first group of data cells being recycled through said NBGN, said second group of data cells being channel grouped by said RNBGN.

22. The switch of claim 21 wherein said data cells are processed such that their sequence is the same as they leave said switch through said outputs.

23. The switch of claim 21 wherein said NBGN sorts said data cells according to whether said data cells are subject to contention.

24. The switch of claim 21 wherein said NBGN has two groups of inputs, one of said input groups being reserved for recycled data cells.

* * * * *